United States Patent
Dye et al.

[19]

[11] Patent Number: 5,855,780
[45] Date of Patent: Jan. 5, 1999

[54] FUEL FILTER ELEMENT WITH FLOW ACTUATOR

[75] Inventors: Richard Dye, Warren, N.J.; John Lowsky, Jr., Fayetteville, N.C.

[73] Assignee: Advanced Performance Technology, Inc., Lugoff, S.C.

[21] Appl. No.: 744,855

[22] Filed: Nov. 4, 1996

[51] Int. Cl.$^6$ .................................................... B01D 35/31
[52] U.S. Cl. ..................... 210/234; 210/248; 210/430; 210/438; 210/458; 210/497.01
[58] Field of Search ..................... 210/232, 234, 210/235, 429, 430, 438, 248, 457, 458, 460, 483, 497.01

[56] References Cited

U.S. PATENT DOCUMENTS

| | | |
|---|---|---|
| 1,407,763 | 2/1922 | Langston . |
| 1,468,906 | 9/1923 | Inman . |
| 1,746,336 | 2/1930 | Breer . |
| 2,071,529 | 2/1937 | Howard . |
| 2,304,618 | 12/1942 | Williams . |
| 2,431,782 | 12/1947 | Walton et al. . |
| 2,533,266 | 12/1950 | Kovacs et al. . |
| 2,642,187 | 6/1953 | Bell . |
| 2,729,339 | 1/1956 | McCoy . |
| 2,858,026 | 10/1958 | Lorimer . |
| 3,000,505 | 9/1961 | Scavuzzo . |
| 3,021,955 | 2/1962 | Joyce . |
| 3,029,836 | 4/1962 | Gruner . |
| 3,040,894 | 6/1962 | Pall . |

(List continued on next page.)

FOREIGN PATENT DOCUMENTS

| | | |
|---|---|---|
| 0426064 | 5/1991 | European Pat. Off. . |
| 0483119 | 4/1992 | European Pat. Off. . |
| 0532161 | 3/1993 | European Pat. Off. . |
| 686520 | 7/1930 | France . |
| 1909130 | 9/1970 | Germany . |
| 1915923 | 10/1970 | Germany . |
| 3249144 | 11/1983 | Germany . |
| 333469 | 12/1935 | Italy . |
| 46-14715 | 5/1971 | Japan . |
| 47-2087 | 1/1972 | Japan . |
| 47-34410 | 10/1972 | Japan . |
| 48-14230 | 5/1973 | Japan . |
| 52-50364 | 4/1977 | Japan . |
| 53-163780 | 12/1978 | Japan . |
| 54-37966 | 3/1979 | Japan . |
| 61-53564 | 4/1986 | Japan . |
| 63-7285 | 3/1988 | Japan . |
| 5-23506 | 2/1993 | Japan . |
| WO/95/00232 | 1/1995 | WIPO . |
| WO/95/07745 | 3/1995 | WIPO . |
| WO/95/13468 | 5/1995 | WIPO . |

*Primary Examiner*—Matthew O. Savage
*Attorney, Agent, or Firm*—Staas & Halsey

[57] ABSTRACT

A filter assembly including a filter housing having a standpipe extending upwardly therethrough, in which is located a spring-biased flow element, and about which is received a replaceable filter element. A screw threaded cover is removably attached to the housing. The filter element includes an upper endcap, a center tube, a lower endcap and cylindrical filter media around the center tube. The lower endcap includes a central opening which receives upwardly therethrough the standpipe in sealed relation. A separate actuator with a projection formed to extend therefrom is located in the center tube, either fixedly or movably, below the upper endcap. When the filter element is placed over the standpipe, and the cover attached to the housing, the projection on the actuator pushes down against the spring-biased flow element, putting cavities formed in the flow element and openings formed in the standpipe in fluid communication. This alignment allows fluid to flow between an area inside the media adjacent the standpipe, to the interior of the standpipe, and out an outlet port of the housing. When the filter element is removed from the housing, for replacement with a new filter element, the projection is removed from the flow element, which returns to its original position to prohibit the fluid communication.

31 Claims, 8 Drawing Sheets

U.S. PATENT DOCUMENTS

| | | |
|---|---|---|
| 3,056,603 | 10/1962 | Roosa . |
| 3,070,232 | 12/1962 | Casaleggi . |
| 3,105,042 | 9/1963 | Roosa . |
| 3,151,071 | 9/1964 | Kasten . |
| 3,232,437 | 2/1966 | Hultgren . |
| 3,363,762 | 1/1968 | Ensign . |
| 3,388,801 | 6/1968 | Boyd et al. . |
| 3,398,831 | 8/1968 | Jones . |
| 3,473,664 | 10/1969 | Hultgren . |
| 3,529,727 | 9/1970 | Bernhard . |
| 3,589,517 | 6/1971 | Palmai . |
| 3,591,007 | 7/1971 | Crowther . |
| 3,608,726 | 9/1971 | Crowther . |
| 3,931,011 | 1/1976 | Richards et al. . |
| 4,035,306 | 7/1977 | Maddocks . |
| 4,052,307 | 10/1977 | Humbert, Jr. . |
| 4,094,791 | 6/1978 | Conrad . |
| 4,139,468 | 2/1979 | Rosaen . |
| 4,369,113 | 1/1983 | Stifelman . |
| 4,485,011 | 11/1984 | Cole et al. . |
| 4,522,712 | 6/1985 | Fischer et al. . |
| 4,619,764 | 10/1986 | Church et al. . |
| 4,836,923 | 6/1989 | Popoff et al. . |
| 4,906,365 | 3/1990 | Baumann et al. . |
| 4,959,141 | 9/1990 | Anderson . |
| 4,976,852 | 12/1990 | Janik et al. . |
| 5,017,285 | 5/1991 | Janik et al. . |
| 5,020,610 | 6/1991 | Lyon et al. . |
| 5,030,345 | 7/1991 | Thomas . |
| 5,049,269 | 9/1991 | Shah . |
| 5,084,170 | 1/1992 | Janik et al. . |
| 5,112,478 | 5/1992 | Mohr ........................................ 210/430 |
| 5,211,846 | 5/1993 | Kott et al. . |
| 5,300,223 | 4/1994 | Wright . |
| 5,312,546 | 5/1994 | Janik . |
| 5,362,389 | 11/1994 | Hardison et al. . |
| 5,362,390 | 11/1994 | Widenhoefer et al. . |
| 5,458,767 | 10/1995 | Stone . |

FUEL FILTER ELEMENT WITH FLOW ACTUATOR

BACKGROUND OF THE INVENTION

1. Field of the Invention

This invention relates to fuel filters and, more particularly, to a replaceable, diesel fuel, filter element that actuates a standpipe flow element in a filter housing.

2. Background Art

As shown in FIG. 1 herein, U.S. Pat. No. 5,458,767 describes a filter assembly 1 including a threaded cover 10, a housing 11, and a replaceable filter element 12. The filter element 12 includes an upper endcap 14, to which a cylindrical filter media 16 is attached. The upper endcap 14 attaches to the cover 10 via a pair of opposing latching fingers 18 removably received in engaging recesses 20 formed on the cover 10. A lower endcap 22 includes a central opening 23 receiving upwardly therethrough a standpipe 24 which houses a spring-biased movable flow element 26.

A downwardly extending hollow projection 28 is formed centrally on the upper endcap 14 and has the following function. In a normal operation, when the cover 10 and the element 12 are attached, a projection 32 formed on the underside of the cover 10 is received in the hollow projection 28. When this combination is screwed onto the filter housing 11, the projection 28 pushes down against the spring-biased flow element 26, thereby putting cavities 34 in the flow element 26 and openings 36 in the standpipe 24 in fluid communication. This alignment allows fluid to flow between an area 38 inside the media 16 adjacent the standpipe 24, to the interior of the standpipe 24, and out an outlet port 42 (not shown).

The element 12 must be replaced after its useful life. To do this, the cover 10 is unscrewed from the housing 11 (which takes the connected filter element 12 with it), whereupon the projection 28 releases its force on the biased flow element 26, which closes under the pressure of a spring 40, and cuts off the above-described fluid communication. The used element 12 is then removed from the cover 10 and discarded, and a new replacement filter element 12 is attached to the cover 10, which is again screwed on the housing 11 for use.

A drawback to this structure is that the projection 28 formed in the upper endcap 14 is difficult to reliably form in a traditional one piece sheet metal endcap. That is, the metal has to be drawn significantly in order to form the elongated projection 28, which is a difficult manufacturing step, and may cause a weak projection 28. Also, flexible latching fingers 18 are required. From a practical point of view, it is necessary to form this entire upper endcap 14 from plastic. Of course, it is then necessary to choose a plastic that is compatible with the fluid that is being filtered. It is also necessary to make a mold for producing the endcap. Further, significant plastic material is used for the entire upper endcap, even though only the projection and latches may require same. These considerations raise the costs of producing the filter relative to one that has a traditional metal upper endcap.

Further, this design generally requires that the cover and the upper endcap be compatible, i.e., that the projection 32 on the cover 10 reliably seat in the projection 28 on the upper end plate 14. To ensure this arrangement, it appears best to require the cover 10 to receive the filter element 12 thereon. Accordingly, this patent describes the separate arrangement of spring fingers 18 that are removably received by recesses 20 on the cover. This type of design, then, requires that the manufacturing parameters for one part be dictated by the parameters of another part. Defects in one during manufacture can affect the other, which can lead to excessive waste. Also, a needed design change in one may necessitate a design change in another. These considerations again may increase costs and limit design flexibility.

SUMMARY OF THE INVENTION

Accordingly, it is a purpose of the present invention to provide a filter element that is simpler in design, more reliable and easier and more cost-efficient to make, than prior art filter elements.

It is another purpose of the present invention to provide a filter element that is not attached to the cover of a filter assembly.

It is another purpose of the present invention to provide a separate actuator in the filter element to move a standpipe flow element in the housing.

It is another purpose of the present invention to provide a separate flow element actuator movable from an upper actuating position to a lower filter element sealing position.

It is another purpose of the present invention to provide a molded flow element actuator that can be made using relatively inexpensive tooling that can be easily changed or modified, if necessary.

It is another purpose of the present invention to provide a center tube actuator/shut off that prevents excess fuel from spilling from a filter element upon removal and replacement of the filter element relative to a housing.

It is another purpose of the present invention to provide a filter element which incorporates a handle to facilitate removal of the element from the filter element housing.

To achieve the foregoing and other purposes of the present invention there is provided a filter housing including a standpipe extending upwardly therethrough, in which is located a spring-biased flow element, and about which is positioned a replaceable filter element. A screw threaded cover is removably attached to a threaded open end of the housing.

The filter element includes an upper endcap with a handle or bailer, a center tube, a lower endcap with an opening to receive the standpipe therethrough, and a cylindrical filter media. The filter element does not connect to the cover of the filter housing.

A separate actuator with a projection formed to extend therefrom is located in the center tube, below the upper endcap. In one embodiment the actuator is a metal member fixedly, i.e. stationarily, received in the center tube. In another embodiment, the actuator is a Nylon, or similar material, disc-like member which moves longitudinally within the center tube.

When the filter element is placed over the standpipe, and the cover is attached to the filter housing, the projection on the actuator pushes down against the spring-biased flow element, thereby putting cavities formed in the flow element and openings formed in the standpipe in fluid communication. This alignment allows fluid to flow between an area inside the media adjacent the standpipe, to the interior of the standpipe, and out an outlet port of the housing.

When the filter element must be replaced after its useful life, the cover is unscrewed from the housing, and the filter element projection releases its force on the biased flow element. The flow element then closes under the pressure of a spring, and cuts off the above-described fluid communication. The used filter element is then fully removed and discarded, a new replacement filter element is placed in the housing, and the cover is again screwed on the housing.

Other features and advantages of the present invention will be apparent from the following description taken in conjunction with the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

The preferred embodiments of the present invention will now be described in greater detail with reference to FIGS. 2–10.

Figure 1:
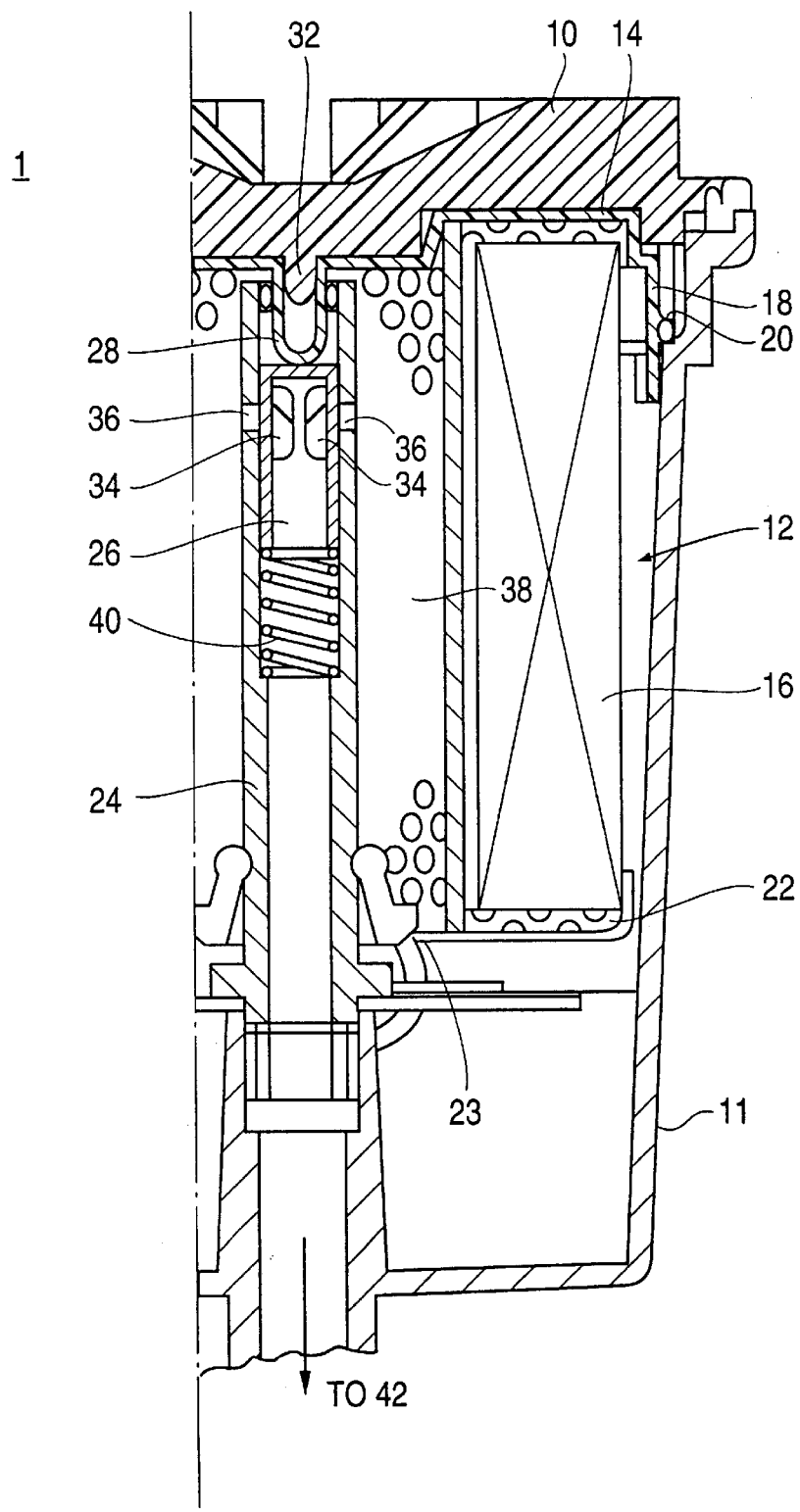
FIG. 1 is a side, cross-sectional view of a portion of a prior art filter assembly, illustrating particularly an upper endcap actuating a flow element in a standpipe.
Figure 2:
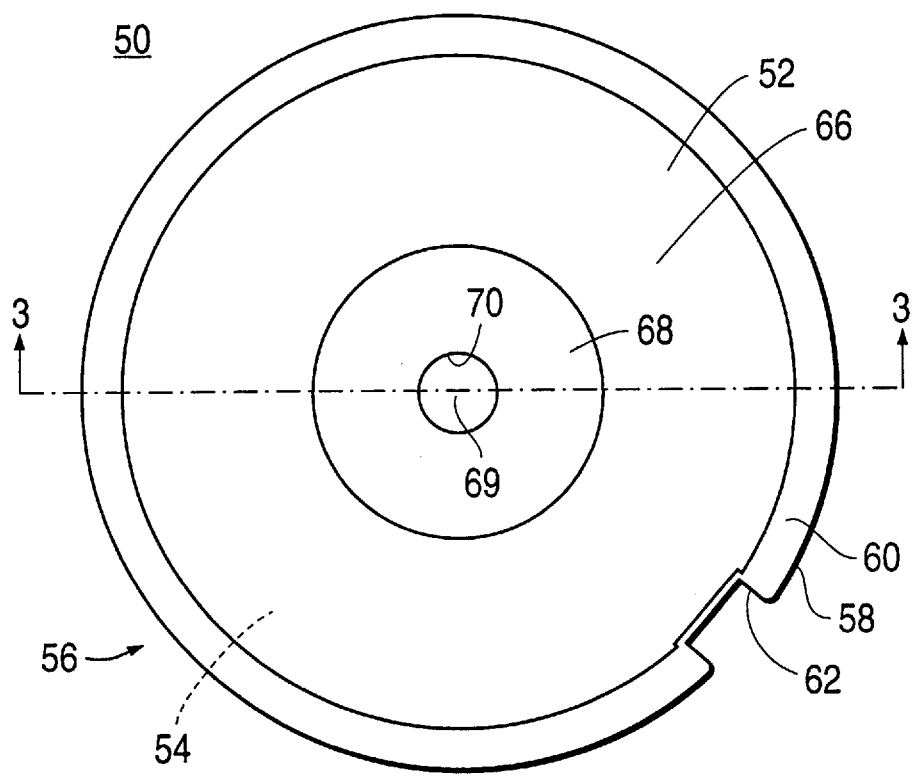
FIG. 2 is a top plan view of a flow element actuator according to a first embodiment of the present invention.
Figure 3:
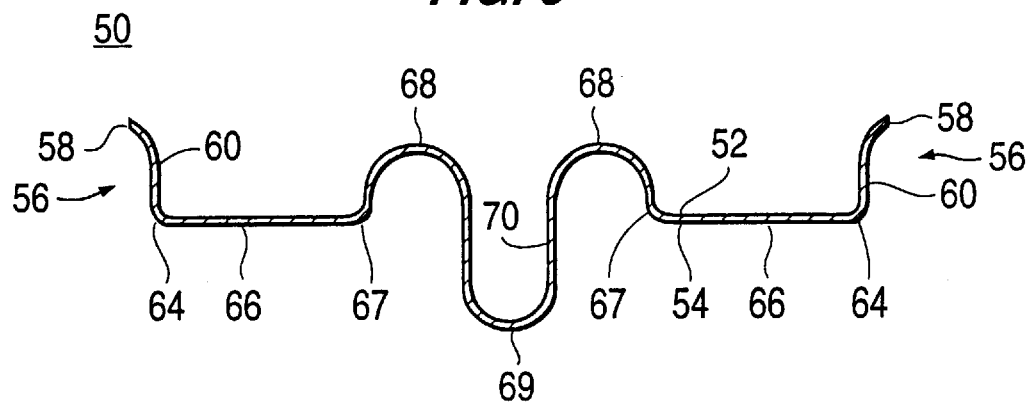
FIG. 3 is a side, cross-sectional view of the actuator shown in FIG. 2.

FIG. 2 is a top plan view of a flow element actuator 50 according to a first embodiment of the present invention, while FIG. 3 is a side, cross-sectional view thereof. This flow actuator 50 is preferably a circular member having a top surface 52 and a bottom surface 54. A periphery 56 of the actuator 50 includes an out-turned edge 58 of an upright wall 60 (viewing FIG. 3).

The out-turned edge 58 includes a recess 62 (FIG. 2), which is for the purpose of fitting around a longitudinal seam 73 in a center tube 72 (FIG. 4) discussed below, which is a common structural feature of a metal center tube. Most particularly, metal center tubes are usually formed from a rectangular sheet of perforated metal, wherein two opposing longitudinal sides are overlapped and connected at, e.g., weld points 75 to form a seam 73 of about twice the thickness of the flat metal sheet.

The periphery 56 merges inwardly at a first corner 64 with a planar portion 66, which merges inwardly and upwardly at a second corner 67 with an arch portion 68, and ultimately to a bottom 69 of a single, central, curved projection 70 extending downwardly (again with reference to FIG. 2).

While certain dimensions are described below, it is to be understood that the dimensions can be easily modified, and are merely for illustrative purposes, as filter elements can be made in many sizes depending upon the particular application intended.

The height of the actuator 50 shown in, for example, FIG. 3, is about 0.268 inch. The outermost diameter of the actuator 50 is about 1.987 inches. The outer diameter of the upright wall 60 portion is about 1.83 inches. The outer diameter of the arch portion 68 is about 0.77 inch. The outer diameter of the projection 70 is about 0.210 inch. The radius of the second corner 67 is about 0.05, the radius of the arch portion 68 is about 0.125 and the radius of the bottom 69 of the projection 70 is about 0.105.

Preferably this actuator 50 is stamped from metal. In this way, the various radii corners, etc. can be accurately and cost effectively formed. Further, in contrast to a plastic part of the same thickness, the metal actuator will hold its shape better, and will appropriately depress on the flow element as the filter element is pushed down on the standpipe, as described below. Also, by using conventional sheet metal to form the actuator 50, there is no potential that the metal will not be compatible with the fuel in the system. Also, by using the metal, the actuator 50 can be thin, which saves material costs. Of course, the actuator 50 could be made of a plastic, such as Nylon 6, or Nylon 12, if made thicker than the sheet metal version shown in, e.g., FIGS. 2 and 3.

Figure 4:
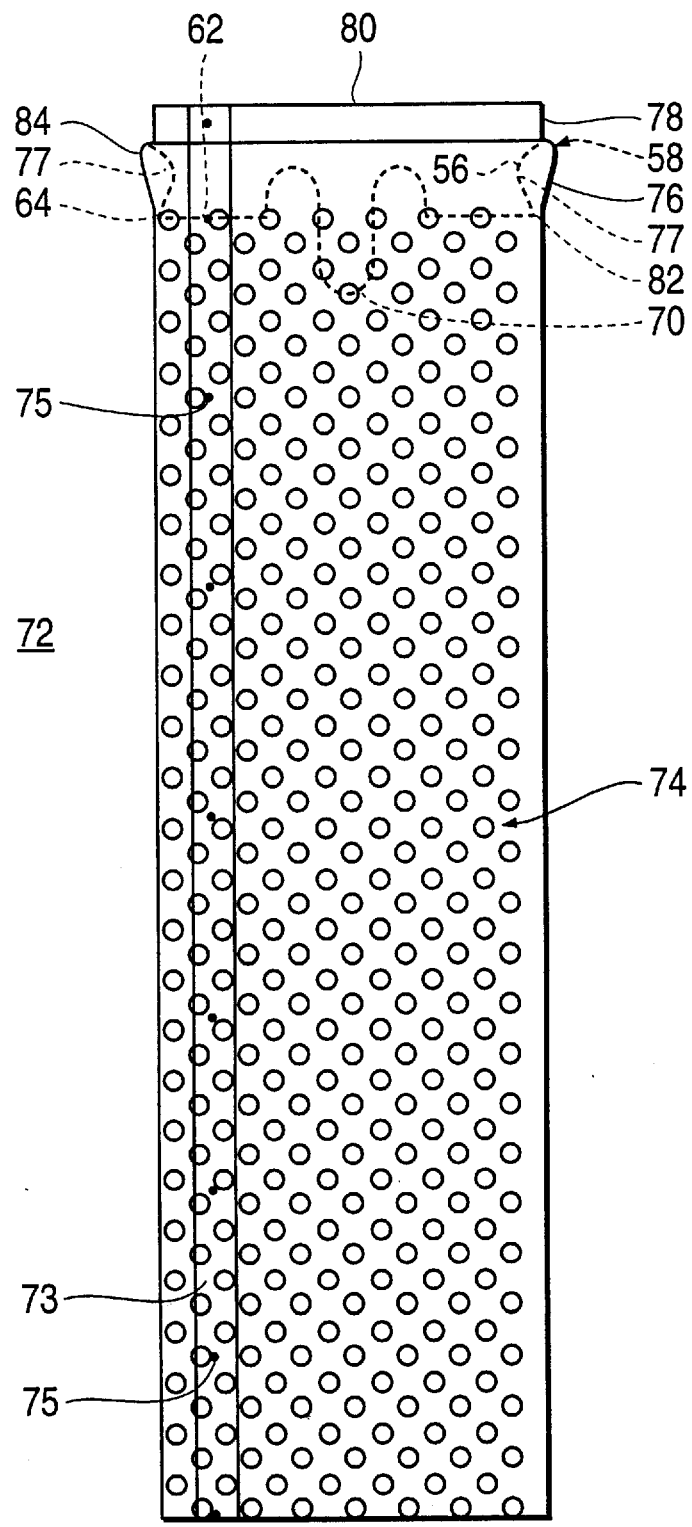
FIG. 4 is a side view of a center tube used with the actuator shown in FIGS. 2 and 3.

FIG. 4 is a side view of a center tube 72 used with the actuator 50 described above. This center tube 72 is a substantially cylindrical member having the longitudinal seam 73, and a plurality of openings 74 formed therein, as in conventional center tubes. The tube 72 is preferably formed of a metal sheet, two ends of which are connected at weld points 75, as is a conventional center tube. Of course, the center tube could be made of plastic. This tube 72 also includes an upper circumferentially protruding portion 76, on top of which is formed a cylindrical termination 78, the combined height of which is about 0.5 inch. The plurality of openings 74 does not extend into the area of the protruding portion 76 or the termination 78.

As shown in phantom lines in FIG. 4, the protruding portion 76 receives the actuator 50 described above with the projection 70 facing downward. More particularly, during assembly, the actuator 50 is inserted in an upper, open end 80 of the center tube 72, and the recess 62 in the periphery 56 is aligned with the seam 73. At this time, the out-turned edge 58 compresses slightly upon insertion to pass by the smaller diameter termination 78. The first corner 64 rests against an area 82, just below the protruding portion 76 of the center tube 72, and the out-turned edge 58 pushes against an inside radius 84 of the protruding portion 76. A conventional sealer, such as Plastisol 77, is placed between the periphery 56 of the actuator 50 and the protruding portion 76 of the center tube 72 to form a fluid tight seal. This seal prevents filtered fuel from escaping from within the center tube 50 to the unfiltered fuel side between the cover 96 and the upper endcap 98.

Figure 5:
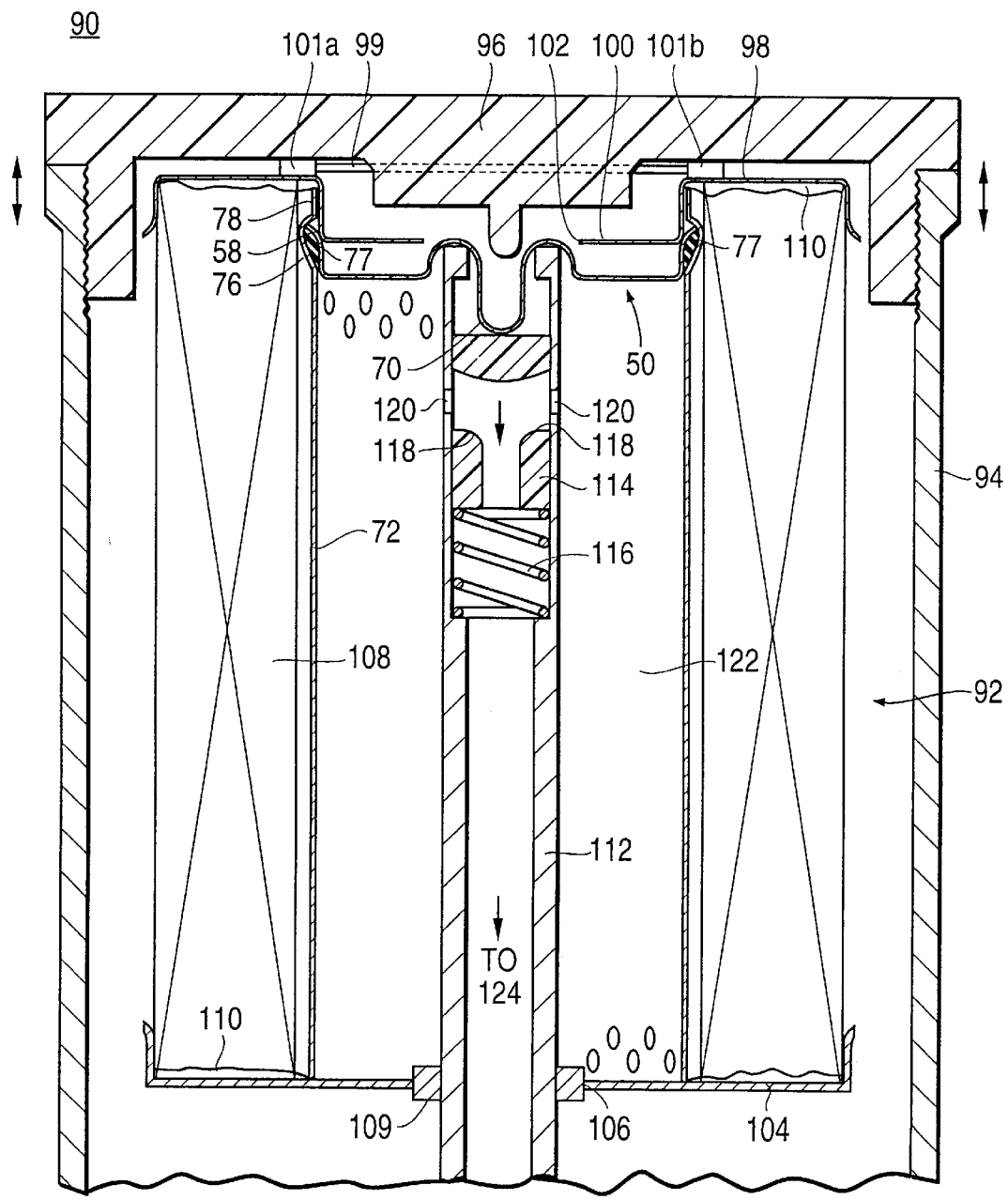
FIG. 5 is a side, cross-sectional view of a portion of the filter assembly according to the first embodiment, illustrating particularly the filter element in the housing, and the cover attached to the housing.

FIG. 5 is a side, cross-sectional view of a filter assembly 90 according to a first embodiment of the present invention, including a filter element 92 in a housing 94, and a cover 96 attached to the housing 94.

More particularly, the filter element 92 includes the center tube 72 with the actuator 50 therein, as described above in relation to FIG. 4. Also, there is included an upper endcap 98 having a central circular recess 100 that is about 1.8 inch in outer diameter and which is received in the termination 78 of the center tube 72, above and separate from the actuator 50. The upper endcap 98 also includes a central opening 102 therein. The filter element 92 also includes a lower endcap 104, which has a central opening 106 receiving a grommet 109 which serves as a seal against the standpipe 112 discussed below, and a conventional cylindrical media 108. The upper endcap 98 and the lower endcap 104 contain ends of the media 108 and are connected thereto by some settable material 110, such as Plastisol.

Figure 6:
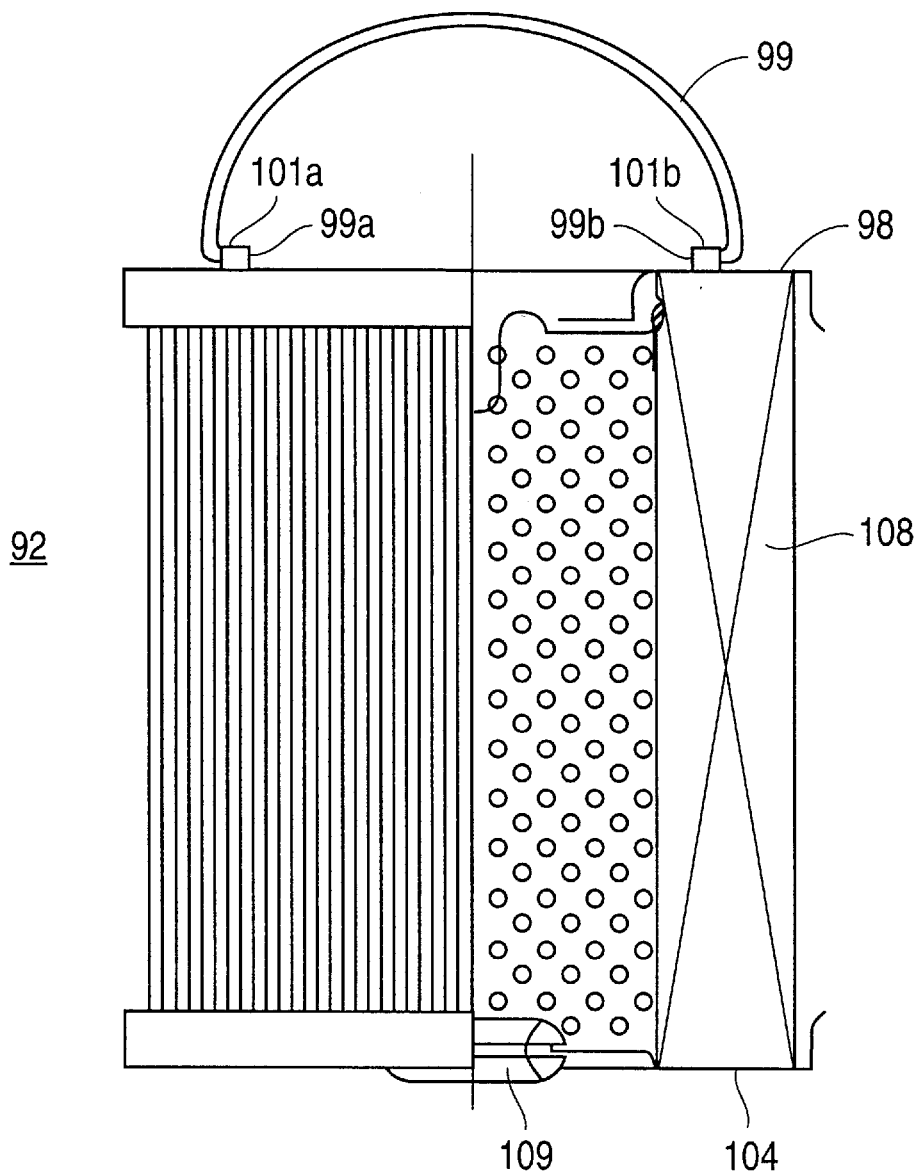
FIG. 6 is a side view of an upper portion of the filter element, illustrating particularly a bailer on the upper endcap.

As shown in FIGS. 5 and 6, the upper endcap 98 includes a bailer 99 which is a semicircular wire-like handle attached at its opposing free ends 99a, 99b to receptacles 101a, 101b formed in the upper endcap 98. See, e.g., U.S. Pat. Nos. 2,642,187 and 2,304,618 for background. The bailer 99 is pivotable within the receptacles 101a, 101b, in an arc of 0° to 180°, so that the bailer 99 can lay flat against the upper endcap 98 to preserve space when the filter element 92 is in the filter housing 94, or can be moved to an extended position, where one can grab the bailer 99 and use it as a handle to remove and replace the filter element 92, as discussed below.

Thus, in contrast to the above-described upper endcap 14 of the '767 patent, which is mechanically connected to the cover 10 via a pair of latching fingers 18 removably received in engaging recesses 20, the upper endcap 98 of the present invention has no mechanical connection to the cover 96, for removal or any other purpose.

Returning to FIG. 5, the lower endcap 104 central opening 106 and grommet 109 receive upwardly therethrough a standpipe 112 which houses a movable flow element 114 biased by a spring 116. The grommet 109 seals against the standpipe 112, again to prevent mixing of filtered and unfiltered fuel.

The projection 70 extending centrally downward from the upper endcap 98 has the following function. When the filter element 92 is on the standpipe 112, and the cover 96 is being screwed onto the housing 94, the cover 96 pushes against the upper endcap 98, which causes the projection 70 to push down against the spring-biased flow element 114, thereby putting cavities 118 in the flow element 114 and openings 120 in the standpipe 112 in fluid communication. This alignment allows, during filter assembly operation, filtered fluid to flow between an area 122 inside the center tube 72 adjacent the standpipe 112, to the interior of the standpipe 112, and out an outlet port 124 (not shown).

When the filter element 92 must be replaced after its useful life, the cover 96 is unscrewed from the housing 94. As the filter element 92 is removed from the housing 94, the projection 70 releases its force on the flow element 114, which closes under the pressure of the spring 116, and cuts off the above-described fluid communication. The used element 92 is then discarded, a new replacement element 92 is placed in the housing 94, and the cover 96 is again screwed on the housing 94.

An alternate embodiment according to the present invention is described below with particular reference to FIGS. 7–10.

Figure 7:
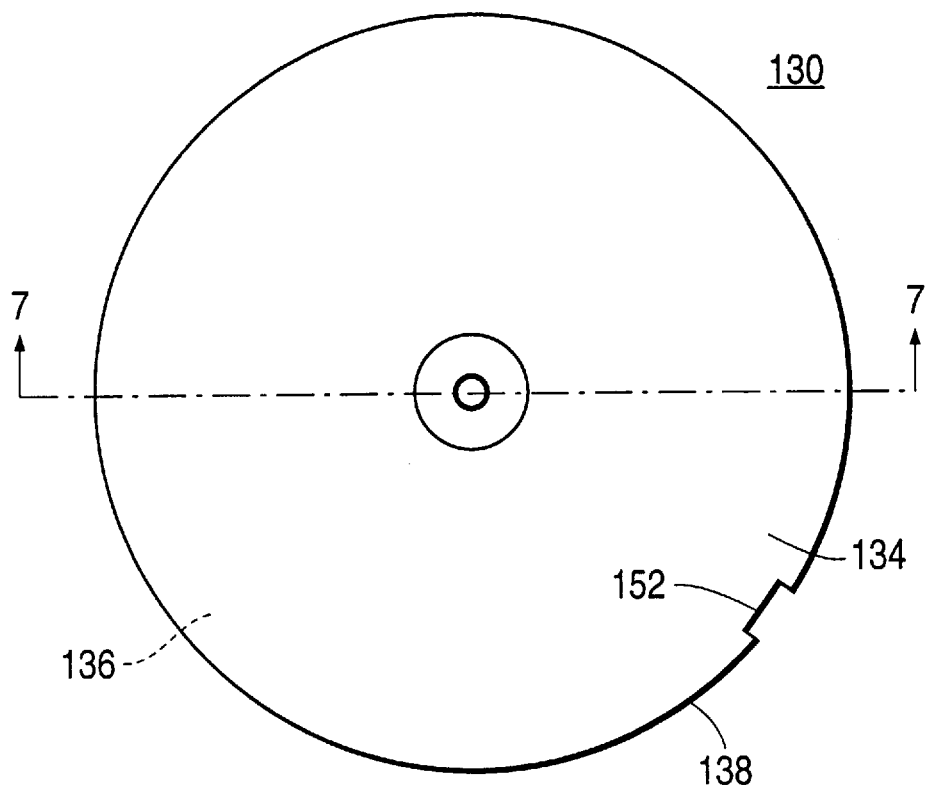
FIG. 7 is a top plan view of a flow element actuator according to a second embodiment of the present invention.
Figure 8:
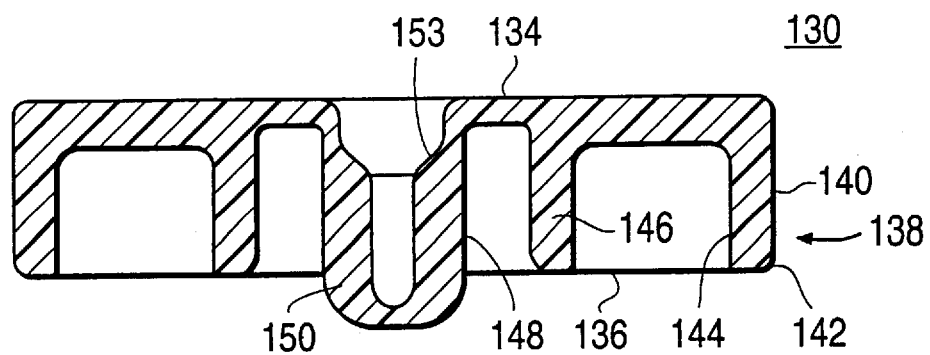
FIG. 8 is a side, cross-sectional view of the actuator shown in FIG. 7.

FIG. 7 is a top plan view of a flow element actuator 130 according to a second embodiment of the present invention, wherein the actuator 130 is a free floating piston, and FIG. 8 is a side, cross-sectional view thereof. The actuator 130 preferably is injection molded of Nylon, Nylon 6, Nylon 12, Capron, or a similar plastic, for good strength and to minimize friction, as same moves within a center tube 132 described below. These plastics are considered compatible with the fuels with which this actuator 130 is to be used.

More particularly, the actuator 130 is a circular member having a substantially planar top surface 134 and a bottom surface 136. A periphery 138 of the actuator 130 includes a wall 140 perpendicular to the top surface 134 (viewing from FIG. 7). Actuator 130 also includes at the periphery 138 a corner 142, and radially inward, a first annular recessed portion 144, a bevelled edged partition 146, a second annular recessed portion 148, and ultimately a single curved central projection 150 extending downwardly. An opening 153 is formed in the top surface 134 of the actuator 130 to provide clearance for a curved member 172 formed on the upper endcap 170 (see FIG. 9), and to otherwise conserve materials. The projection 150 includes an opening 152 formed therein for the purpose of receiving a center tube seam, if a metal center tube with a seam formed thereon is used, as described above.

The diameter of the actuator 130 is about 1.855 inches. The width of the projection 150 is about 0.340 inches. The distance from the top surface 134 to the bottom surface 136 is about 0.400 inches. This distance is chosen to be sufficient to allow the peripheral wall 140 to ride along an inside wall 154 of the center tube 132, and to prevent the actuator 130 from being oriented anything other than perpendicular to a longitudinal axis 156 of the center tube 132, so that the actuator 130 can move freely and reliably within the center tube 132, up or down.

Figure 9:
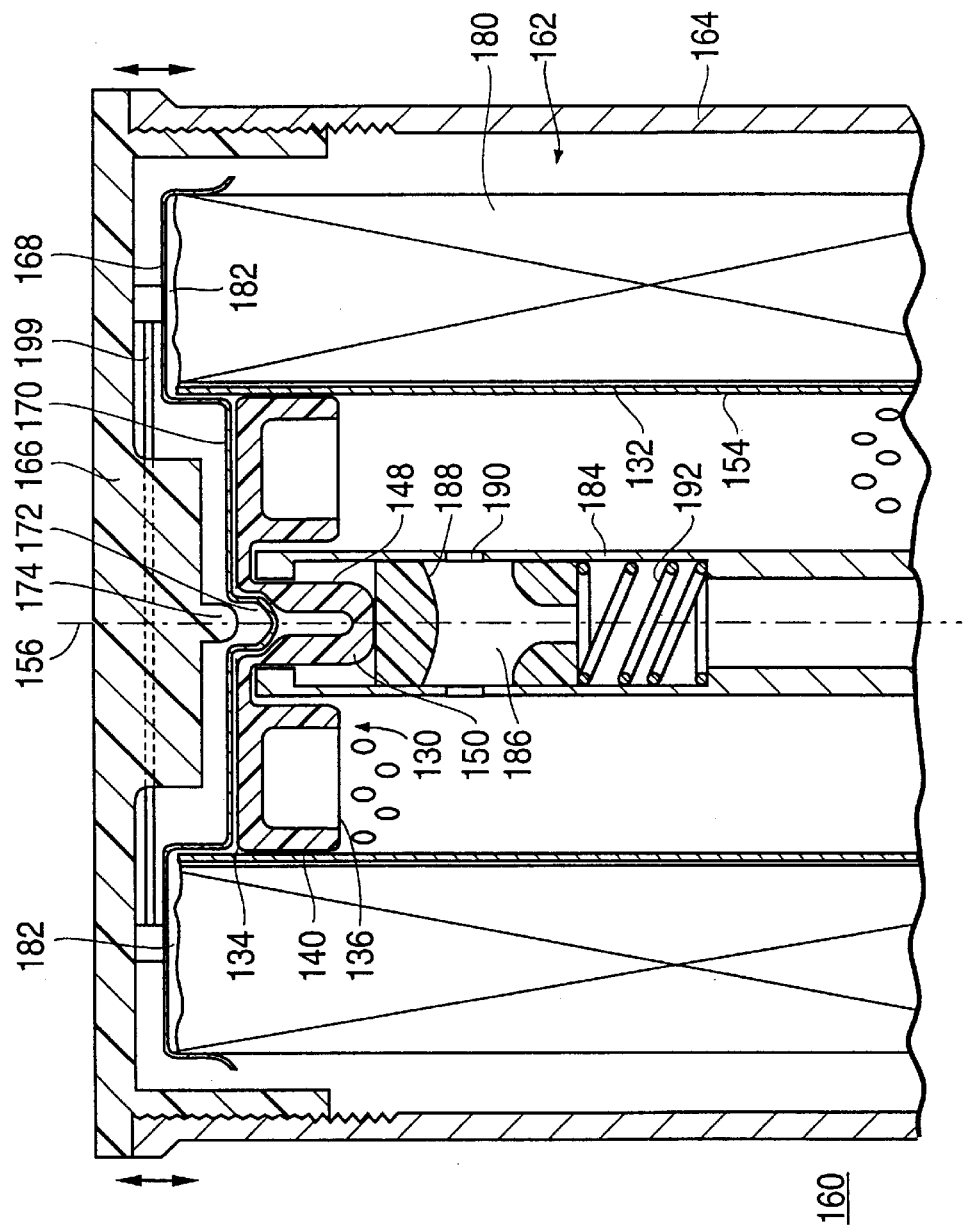
FIG. 9 is a side, cross-sectional view of a portion of a filter assembly according to the second embodiment, illustrating particularly the filter element in the housing and the cover attached to the housing.

FIG. 9 is a side, cross-sectional view of a filter assembly 160 according to an alternate embodiment of the present invention including a filter element 162, a housing 164, and a cover 166 attached to the housing 164.

More particularly, the filter element 162 includes a center tube 132 and the actuator 130 described above. In contrast to the center tube 72 described above, however, this center tube 132 is simply a cylindrical member, lacking the protruding portion 76. Instead, the center tube 132 is intended to have a smooth cylindrical inner surface along which the free floating actuator 130 can move. The center tube 132 could be metal or plastic, as desired.

Also, the filter element 162 includes an upper endcap 168 having a central, circular recess 170 that is again about 1.8 inch in outer diameter, and which is received in an upper portion of the center tube 132, above and separate from the actuator 130. The upper endcap 168 also includes formed therein a curved member 172 that receives in spaced relation a projection 174 formed to extend downward from the cover 166. However, there is no support or other contact between the curved member 172 and the projection 150 on the actuator 130.

The filter element 162, like the filter element 92 described above, includes a lower endcap 192 (FIG. 10), which has a central opening formed therein to receive a standpipe 184, and a cylindrical media 180, as is conventional. The upper endcap 168 and the lower endcap contain the media 180 and are again connected thereto by some settable material 182, such as Plastisol.

Again, as with the first embodiment of the filter element 92 described above, the second embodiment of the filter element 162 uses a bailer 199 to facilitate removal and replacement of the filter element 162.

As with the first embodiment described above, unlike the '767 patent, the upper endcap 168 has no mechanical connection to the cover 166.

When this filter element 162 is placed on the standpipe 184 along axis 156, the projection 150 abuts a spring-biased flow element 186 housed in the standpipe 184. As the filter element 162 is pushed onto the standpipe 184, the free floating actuator 130 moves upwardly in the center tube 132 along an interior wall 154 thereof until it contacts the underside of the upper endcap 168. At this time, the projection 150 on the actuator 130 no longer moves upward into the filter element 162 and instead applies downward pressure on the flow element 186. As the cover 166 is screwed on the filter housing 164, the cover 166 pushes against the upper endcap 168, wherein the projection 150 forces cavities 188 in the flow element 186 and openings 190 in the standpipe 184 into fluid communication, as with the first embodiment described above. Also, as with the embodiment described above, this alignment allows flow between an area inside the center tube to the interior of the standpipe, and out an outlet port (not shown) for the purposes of operation of the filter assembly.

When the filter element 162 must be replaced after its useful life, the cover 166 is unscrewed from the housing 164. The filter element 162 is then removed from the housing 164 using the bailer 199, which causes the projection 150 to release its force on the flow element 186, which closes under the pressure of the spring 192, and cuts off the above-described fluid communication.

Figure 10:
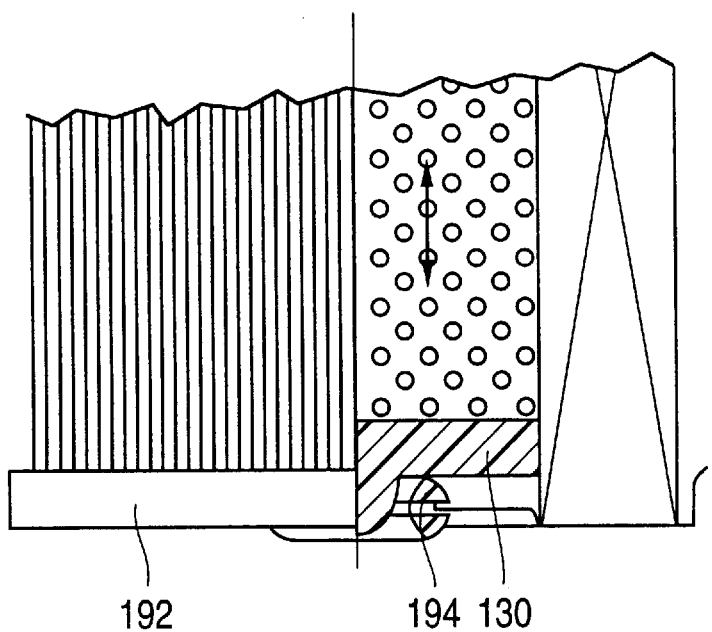
FIG. 10 is a side, cross-sectional view of the actuator according to the second embodiment sealing against a grommet in the filter element.

As the filter element 162 is removed from the standpipe, the actuator 130 moves downward along the center tube 154, and as shown in FIG. 10, finally rests against the grommet 194. In this way, the actuator 130 serves to seal off the bottom of the filter element 162 to prevent fluid therein from leaking out during replacement.

The used element 162 is then discarded, a new replacement element 162 is placed in the housing 164, and the cover 166 is again screwed on the housing 164.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

What is claimed is:

1. A filter element, comprising:
   a center tube;
   a media surrounding the center tube;
   an upper endcap connected to and supporting the media, wherein said upper end cap is positioned adjacent to an upper end of said center tube and substantially closes the upper end of said center tube; and
   a flow element actuator, which is a separate piece from the upper endcap, and which contacts an interior of the center tube below the upper endcap, said actuator including a projection extending away from the upper endcap to move a flow element;
   wherein said actuator is movable relative to the upper endcap.

2. The filter element as recited in claim 1, further comprising a lower endcap, said actuator being movable between the upper and lower endcaps.

3. The filter element as recited in claim 2, wherein the actuator moves between the upper and lower endcaps along the center tube.

4. The filter element as recited in claim 3, wherein the lower endcap has a central opening.

5. The filter element as recited in claim 4, further comprising a seal located at the opening in the lower end cap, wherein the actuator is movable into a position against the seal.

6. The filter element as recited in claim 1, wherein the actuator is a circular member having a substantially planar top surface, a bottom surface, sides perpendicular to the top surface, and the projection extends from the bottom surface.

7. The filter element as recited in claim 6, wherein the perpendicular sides of the actuator slide against the interior of the center tube.

8. The filter element as recited in claim 1, wherein the actuator is plastic.

9. The filter element as recited in claim 8, wherein the plastic is Nylon.

10. The filter element as recited in claim 1, wherein the center tube is a cylindrical member having a plurality of openings formed therein.

11. A fluid filter assembly, comprising:
    a housing;
    a standpipe located in the housing, and having an opening, and a cavitied flow element movable between first non-fluid communication and second fluid communication positions with the opening;
    a cover attached to the housing; and
    a filter element removably received in the housing, wherein the filter element includes
       a hollow center tube positioned around the standpipe;
       a media surrounding the center tube;
       an upper endcap connected to and supporting the media; and
       a flow element actuator, which is a separate piece from the upper endcap and contacts an interior of the center tube below the upper endcap, said actuator including a projection extending away from the upper endcap to move the flow element,
       wherein said actuator is movable relative to the upper endcap.

12. The filter assembly as recited in claim 11, wherein the filter element further comprises a lower endcap having a central opening which receives therethrough the standpipe, and wherein the acutator is movable between the upper and lower endcaps.

13. The filter assembly as recited in claim 11, wherein, when the filter element is positioned in the housing, the projection moves the flow element, into the second position.

14. The filter assembly as recited in claim 11, wherein the actuator movable contacts the center tube.

15. The filter assembly as recited in claim 11, wherein the actuator is a circular member having a substantially planar top surface, a bottom surface, sides perpendicular to the top, and the projection extends from the bottom surface.

16. The filter assembly as recited in claim 11, wherein the actuator is plastic.

17. The filter assembly as recited in claim 16, wherein the plastic is Nylon.

18. The filter assembly element as recited in claim 16, wherein the perpendicular sides of the actuator slide against the interior of the center tube.

19. The filter assembly as recited in claim 11, wherein the center tube is a cylindrical member having a plurality of openings formed therein.

20. A method for manufacturing a filter element, comprising the steps of:
    forming a center tube;
    forming a media to surround the center tube;
    forming an upper endcap connected to and supporting the media;

forming an actuator as a separate piece from the upper endcap, said actuator including a projection;

contacting an interior of the center tube below the upper endcap with the actuator so that the projection extends away from the upper endcap; and moving the actuator relative to the upper endcap from a position spaced from the upper endcap to a position abutting the upper endcap.

21. A method for manufacturing a fluid filter assembly, comprising the steps of:

forming a housing to include a standpipe with an opening and a cavitied flow element movable between first non-fluid communication and second fluid communication positions with the opening, and a cover attached to the housing;

forming a filter element to include
a hollow center tube positioned around the standpipe,
a media surrounding the center tube,
an upper end cap, and
an actuator separate from the upper endcap, said actuator including a projection;
contacting an interior of the center tube below the upper endcap with the actuator, so that the projection extends away from the upper endcap; and
removably locating the filter element in the housing.

22. The method as recited in claim 21, wherein the contacting step comprises fixedly contacting the actuator in the center tube.

23. The method as recited in claim 21, wherein the actuator forming step comprises forming a circular member having a top surface, a bottom surface, a periphery including an out-turned edge, an upright wall and a corner, and a planar portion which merges inwardly to an arch portion merging with the projection.

24. The method as recited in claim 21, wherein the center tube forming step comprises forming a cylindrical member having a plurality of openings therein, and an upper circumferentially protruding portion, on top of which is formed a cylindrical termination.

25. The method assembly as recited in claim 21, wherein the contacting step comprises resting the corner of the actuator against a portion of the center tube below the protruding portion, resting the out-turned edge against an interior of the protruding portion, and sealing the actuator relative to the center tube.

26. The method as recited in claim 21, wherein the locating step comprises pushing the projection against the flow element to move the flow element into the second position.

27. The method as recited in claim 21, wherein the contacting step comprises movably contacting the actuator in the center tube.

28. The method as recited in claim 21, further comprising the steps of;

forming the filter element to include a lower end cap with an opening;

forming a seal in the opening; and moving the actuator against the seal.

29. The method as recited in claim 21, wherein the actuator forming step comprises forming a circular member having a substantially planar top surface, a bottom surface, sides perpendicular to the top surface, and the projection extending from the bottom surface.

30. The method as recited in claim 29, wherein the contacting step comprises sliding the perpendicular sides of the actuator against the interior of the center tube.

31. The method as recited in claim 21, wherein the center tube forming step comprises forming a cylindrical member having a plurality of openings therein.

* * * * *